(12) United States Patent
Lo et al.

(10) Patent No.: US 11,776,568 B2
(45) Date of Patent: Oct. 3, 2023

(54) DEVICE LIFETIME IMPROVEMENT THROUGH CONSTANT TEMPERATURE

(71) Applicant: Western Digital Technologies, Inc., San Jose, CA (US)

(72) Inventors: Yu Lo, Foster City, CA (US); Yan Liu, Irvine, CA (US); Timothy A. Riener, Fremont, CA (US); Feng Liu, San Ramon, CA (US); Yunfei Ding, Fremont, CA (US); Yaw-Shing Tang, San Jose, CA (US); Karl A. Flechsig, Los Gatos, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/652,070

(22) Filed: Feb. 22, 2022

(65) Prior Publication Data

US 2023/0267954 A1    Aug. 24, 2023

(51) Int. Cl.
*G11B 5/40*     (2006.01)
*G11B 33/14*    (2006.01)
*G11B 5/00*     (2006.01)

(52) U.S. Cl.
CPC .............. *G11B 5/40* (2013.01); *G11B 33/144* (2013.01); *G11B 2005/0018* (2013.01)

(58) Field of Classification Search
None
See application file for complete search history.

(56) References Cited

U.S. PATENT DOCUMENTS

| 5,991,113 | A | 11/1999 | Meyer et al. | |
| 7,227,711 | B2 | 6/2007 | Che et al. | |
| 8,760,779 | B2 | 6/2014 | Johns et al. | |
| 8,848,495 | B1* | 9/2014 | Wu | G11B 5/6088 |
| | | | | 369/13.33 |
| 8,902,546 | B1* | 12/2014 | Takayama | G11B 5/314 |
| | | | | 360/234.4 |
| 8,995,088 | B1 | 3/2015 | Boone et al. | |
| 9,001,444 | B1 | 4/2015 | Contreras et al. | |

(Continued)

FOREIGN PATENT DOCUMENTS

JP    2013543204 A    11/2013

OTHER PUBLICATIONS

Zhong et al. "Effective heat dissipation in an adiabatic near-field transducer for HAMR," Optics Express, Jul. 23, 2018, vol. 26, No. 15, pp. 18842-18854, https://doi.org/10.1364/OE.26.018842.

*Primary Examiner* — Peter Vincent Agustin
(74) *Attorney, Agent, or Firm* — PATTERSON + SHERIDAN, LLP; Steven H. VerSteeg

(57) ABSTRACT

The present disclosure generally relates to improved lifetime of a data storage device utilizing an energy assist element. Rather than applying the same current to each energy assist element of a device, each energy assist element has a write current specific to the energy assist element. The unique applied current results in the corresponding energy assist elements having substantially the same temperature during operation. Obtaining substantially the same temperature during operation provides predictable and repeatable device performance and increases the lifetime of the entire data storage device as all energy assist elements should have substantially the same lifetime.

21 Claims, 8 Drawing Sheets

(56) References Cited

U.S. PATENT DOCUMENTS

| | | | |
|---|---|---|---|
| 9,111,558 B1* | 8/2015 | Krichevsky | G11B 5/6088 |
| 9,495,995 B1* | 11/2016 | Zhu | G11B 5/012 |
| 9,697,857 B1* | 7/2017 | Ahner | G11B 5/02 |
| 10,366,714 B1 | 7/2019 | Olson et al. | |
| 10,424,323 B1 | 9/2019 | Contreras et al. | |
| 10,566,014 B2 | 2/2020 | Poss | |
| 10,679,650 B2 | 6/2020 | Bai et al. | |
| 10,839,831 B1* | 11/2020 | Nguyen | G11B 5/3133 |
| 10,971,177 B1* | 4/2021 | Angelo | G11B 13/08 |
| 2011/0038080 A1* | 2/2011 | Alex | G11B 5/314 |
| | | | 360/123.02 |
| 2011/0134561 A1* | 6/2011 | Smith | G11B 5/3133 |
| | | | 360/59 |
| 2014/0293760 A1* | 10/2014 | Tomikawa | G11B 5/02 |
| | | | 369/13.26 |
| 2016/0267930 A1* | 9/2016 | Chu | G11B 5/4866 |
| 2017/0330591 A1* | 11/2017 | Granz | G11B 7/126 |
| 2021/0090605 A1* | 3/2021 | Suzuki | G11B 5/187 |

\* cited by examiner

DEVICE LIFETIME IMPROVEMENT THROUGH CONSTANT TEMPERATURE

BACKGROUND OF THE DISCLOSURE

Field of the Disclosure

Embodiments of the present disclosure generally relate to improving data storage device lifetime through use of constant temperature in energy assisted devices.

Description of the Related Art

With the introduction of energy assist writer technologies for hard disk drive (HDD) and tape enhanced drive (TED) devices, the lifetime of the writer element is impacted. Such energy assist writer technologies include energy assisted magnetic recording (EAMR), enhanced perpendicular magnetic recording (ePMR), heat assisted magnetic recording (HAMR) and microwave assisted magnetic recording (MAMR), to name a few. Datacenter product reliability specifications are very demanding, and therefore improving lifetime capabilities of new write elements, such as energy assist elements, can be challenging.

The lifetime of the energy assist element is directly related to the operating temperature of the energy assist element. Therefore, the most straightforward approach to increase device lifetime is to reduce the energy assist element's temperature. However, reducing the energy assist element's temperature also means reducing the bias to the energy assist element, which directly leads to poorer writing performance or less recording performance gain. Poorer writing performance or less recording performance gain defeats the purpose of using the energy assist element. Thus, reducing the overall temperature of the energy assist element is not desirable. A smarter approach is needed to achieve the competing goals of both lifetime and writing performance. Therefore, there is a need in the art for improved use of an energy assist element to increase device lifetime.

SUMMARY OF THE DISCLOSURE

The present disclosure generally relates to improved lifetime of a data storage device utilizing an energy assist element. Rather than applying the same current to each energy assist element of a device, each energy assist element has a write current specific to the energy assist element. The unique applied current results in the corresponding energy assist elements having substantially the same temperature during operation. Obtaining substantially the same temperature during operation provides predictable and repeatable device performance and increases the lifetime of the entire data storage device as all energy assist elements should have substantially the same lifetime.

In one embodiment, a data storage device comprises: a first write head having a first energy assist element; a second write head having a second energy assist element; and a controller coupled to the first write head and the second write head, wherein the controller is configured to apply a first current to the first energy assist element and a second current to the second energy assist element, wherein the first current is different from the second current.

In another embodiment, a data storage device comprises: a first means for assisting a writing of data to a storage media; a second means for assisting a writing of data to the storage media; and a controller coupled to the first means and the second means, wherein the controller is configured to cause a different current to be delivered to the first means and the second means while each of the first means and the second means is assisting writing of data to the storage media.

In another embodiment, a method of manufacturing a data storage device comprises: obtaining a first resistance of a first energy assist element of a first write head; calculating a first current to be applied to the first energy assist element to achieve a first temperature of a first main pole of the first write head; obtaining a second resistance of a second energy assist element of a second write head; calculating a second current to be applied to the second energy assist element to achieve a second temperature of a second main pole of the second write head, wherein the first temperature is substantially equal to the second temperature; configuring a controller to apply the first current to the first energy assist element when writing data to a storage media; and configuring the controller to apply the second current to the second energy assist element when writing data to the storage media.

In another embodiment, a method of writing data in a data storage device comprising a first write head comprising a first energy assist element and a second write head comprising a second energy assist element, the method comprising: applying a first target bias current to the first energy assist element when using the first write head to write data to a storage media, to achieve a first temperature of a main pole of the first write head; and applying a second target bias current to the second energy assist element when using the second write head to write data to the storage media, to achieve a second temperature of a main pole of the second write head, wherein first temperature is substantially equal to the second temperature, and wherein the first current and the second current are different.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved lifetime of a data storage device utilizing an energy assist element. Rather than applying the same current to each energy assist element of a device, each energy assist element has a write current specific to the energy assist element. The unique applied current results in the corresponding energy assist elements having substantially the same temperature during operation. Obtaining substantially the same temperature during operation provides predictable and repeatable device performance and increases the lifetime of the entire data storage device as all energy assist elements should have substantially the same lifetime.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
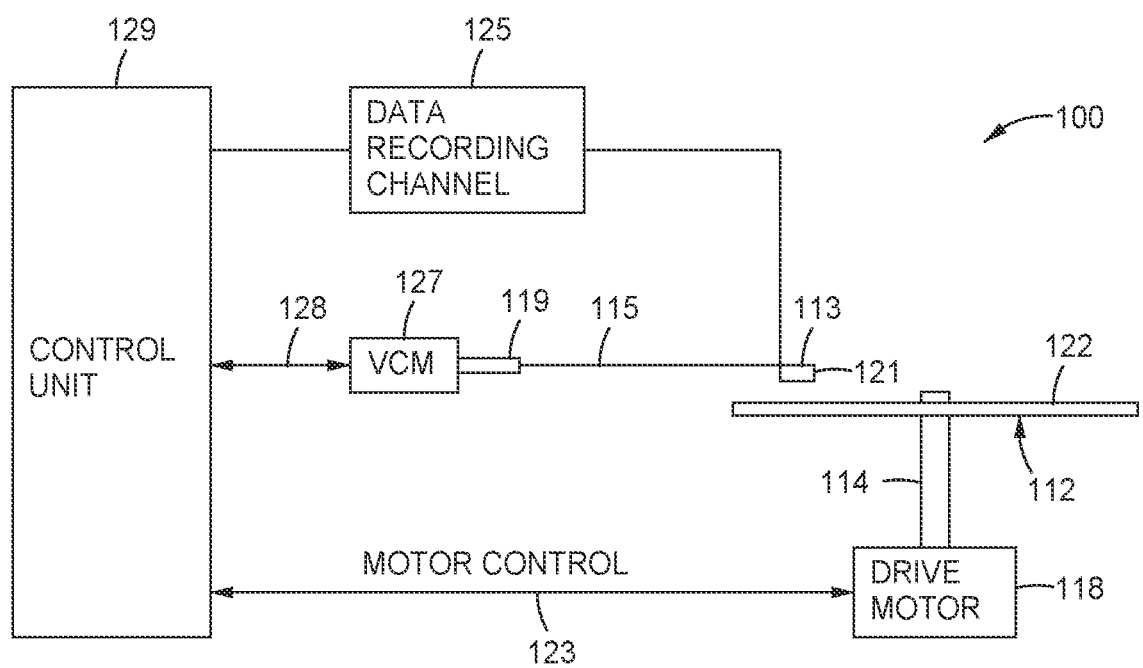
FIG. 1 illustrates a schematic view of a disk drive, according to one implementation.

FIG. 1 illustrates a schematic view of a disk drive (e.g., magnetic recording device) 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports the slider 113 off and slightly above the media 112 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
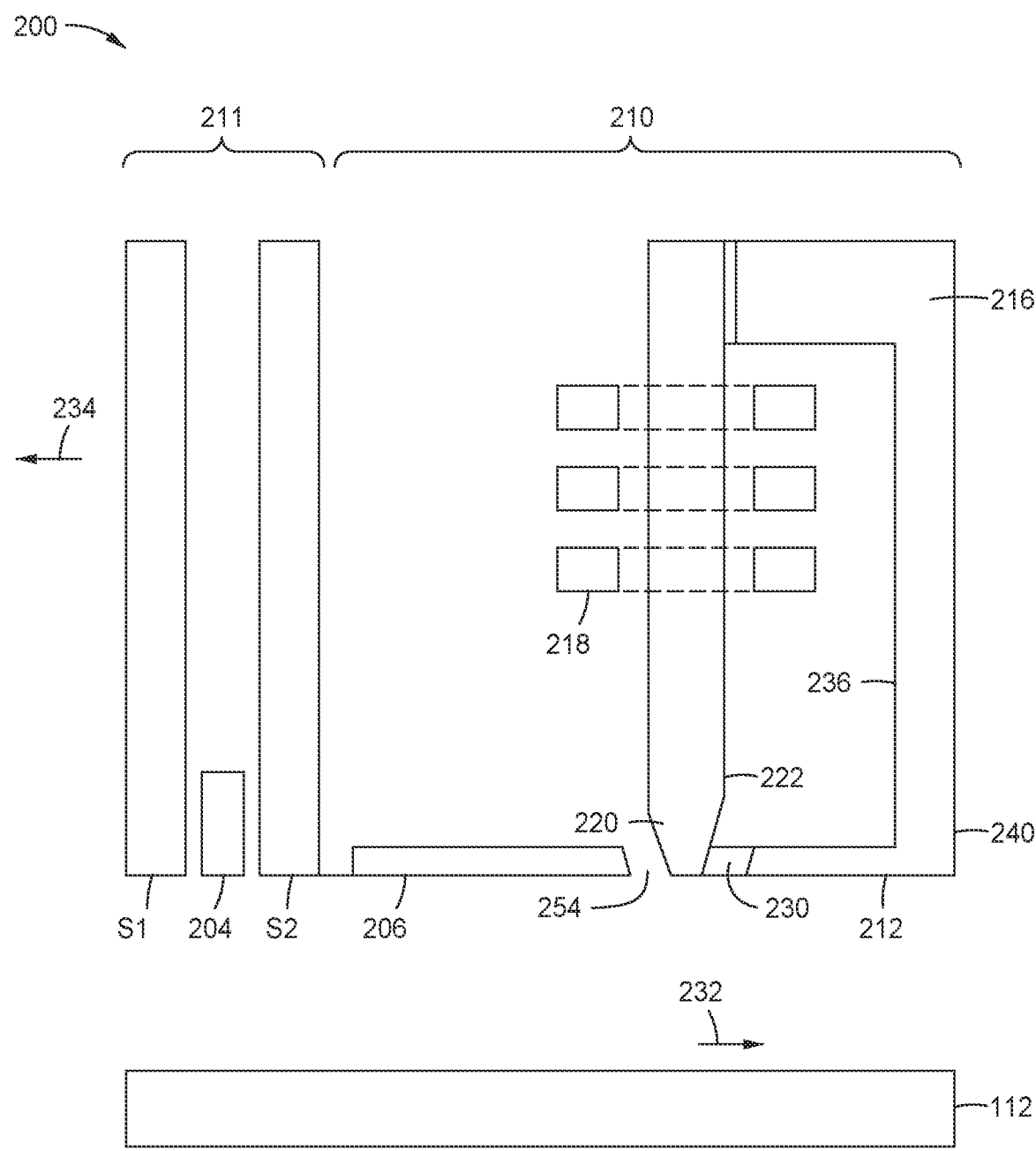
FIG. 2 is a fragmented and schematic cross-sectional side view through a center of a read/write head facing the magnetic media, according to one implementation.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole coupled to a trailing shield 240, and a coil 218 that excites the main pole 220. The write head 210 also comprises a leading shield 206. The coil 218 may have a "pancake" structure which winds around a back-contact between the main pole 220 and the return pole 216, instead of a "helical" structure shown in FIG. 2. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni. The read/write head 200 may be an EAMR head that comprises a write assist element 230, oftentimes referred to as an energy assist element. The write assist element 230 is disposed between the main pole and at least one of: the trailing shield, the leading shield, the first side shield, and the second side shield. In one embodiment, a write assist element 230 is disposed between the trailing shield 240 and the main pole 220, as shown in FIG. 2, and/or between the leading shield 206 and the main pole 220 (gap 254). During writing, a DC or AC electric-current flows through the assist element to enhance writing performance.

In one embodiment, the write assist element 230 may include a spin torque oscillator (STO). In other embodiments, the write assist element 230 may include a multi-layer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference.

Figure 3:
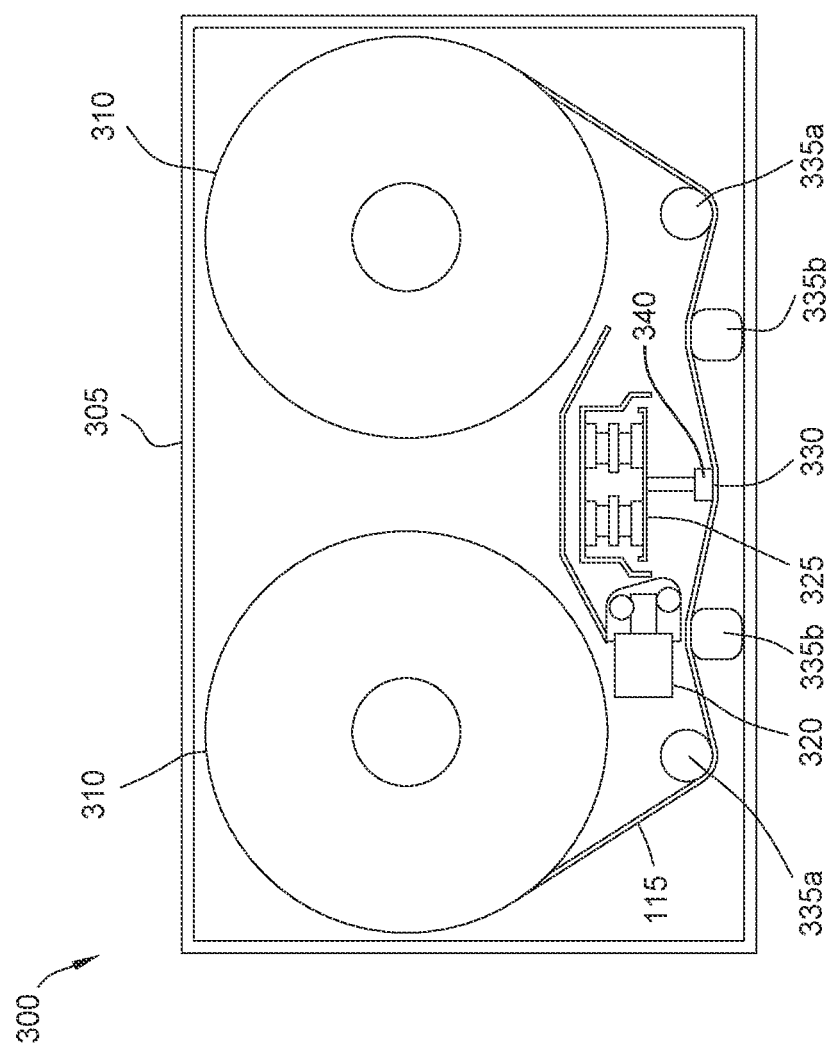
FIG. 3 is a simplified top down of a tape drive in accordance with some embodiments.

FIG. 3 illustrates a simplified top down view of a tape drive 300, in accordance with some embodiments. The tape drive 300 may be a tape embedded drive (TED). The tape drive 300 comprises a casing 305, one or more tape reels 310, one or more motors (e.g., a stepping motor 320 (also known as a stepper motor), a voice coil motor (VCM) 325, etc.) a head assembly 330 with heads 340 such as one or more read heads and one or more write heads, and tape guides/rollers 335a, 335b. In the descriptions herein, the term "head assembly" may be referred to as "magnetic recording head", interchangeably, for exemplary purposes. In an embodiment, most of the components are within an interior cavity of the casing, except a printed circuit board assembly, which is mounted on an external surface of the casing 305. In the descriptions herein, the term "tape" may be referred to as "magnetic media", interchangeably, for exemplary purposes.

In FIG. 3, two tape reels 310 are placed in the interior cavity of the casing 305, with the center of the two tape reels 310 on the same level in the cavity and with the head assembly 330 located in the middle and below the two tape reels 310. Tape reel motors located in the spindles of the tape reels 310 can operate to wind and unwind the tape media 315 in the tape reels 310. Each tape reel 310 may also incorporate a tape folder to help the tape media 315 be neatly wound onto the reel 310. One or more of the tape reels 310 may form a part of a removable cartridge and are not necessarily part of the tape drive 300. In such embodiments, the tape drive 300 may not be a tape embedded drive as it does not have embedded media, the drive 300 may instead be a tape drive configured to accept and access magnetic media or tape media 315 from an insertable cassette or cartridge (e.g., an LTO drive), where the insertable cassette or cartridge further comprises one or more of the tape reels 310 as well. In such embodiments, the tape or media 315 is contained in a cartridge that is removable from the drive 300. The tape media 315 may be made via a sputtering process to provide improved areal density. The tape media 315 comprises two surfaces, an oxide side and a substrate side. The oxide side is the surface that can be magnetically manipulated (written to or read from) by one or more read/write heads. The substrate side of the tape media 315 aids in the strength and flexibility of the tape media 315.

Tape media 315 from the tape reels 310 are biased against the guides/rollers 335a, 335b (collectively referred to as guides/rollers 335) and are movably passed along the head assembly 330 by movement of the reels 310. The illustrated embodiment shows four guides/rollers 335a, 335b, with the two guides/rollers 335a furthest away from the head assembly 330 serving to change direction of the tape media 315 and the two guides/rollers 335b closest to the head assembly 330 by pressing the tape media 315 against the head assembly 430.

The voice coil motor 325 and stepping motor 320 may variably position the tape head(s) transversely with respect to the width of the recording tape. The stepping motor 320 may provide coarse movement, while the voice coil motor 325 may provide finer actuation of the head(s). In an embodiment, servo data may be written to the tape media to aid in more accurate position of the head(s) along the tape media 315.

There is a wide variety of possible placements of the internal components of the tape drive 300 within the casing 305. In particular, as the head mechanism is internal to the casing in certain embodiments, the tape media 315 may not be exposed to the outside of the casing 305, such as in conventional tape drives. Thus, the tape media 315 does not need to be routed along the edge of the casing 305 and can be freely routed in more compact and/or otherwise more efficient ways within the casing 305. Similarly, the head(s) 330 and tape reels 310 may be placed in a variety of locations to achieve a more efficient layout, as there are no design requirements to provide external access to these components.

In some embodiments, the tape drive 300 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 305. The drive 300 may be filled by helium, nitrogen, hydrogen, or any other typically inert gas.

In various embodiments, the drive 300 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 4A:
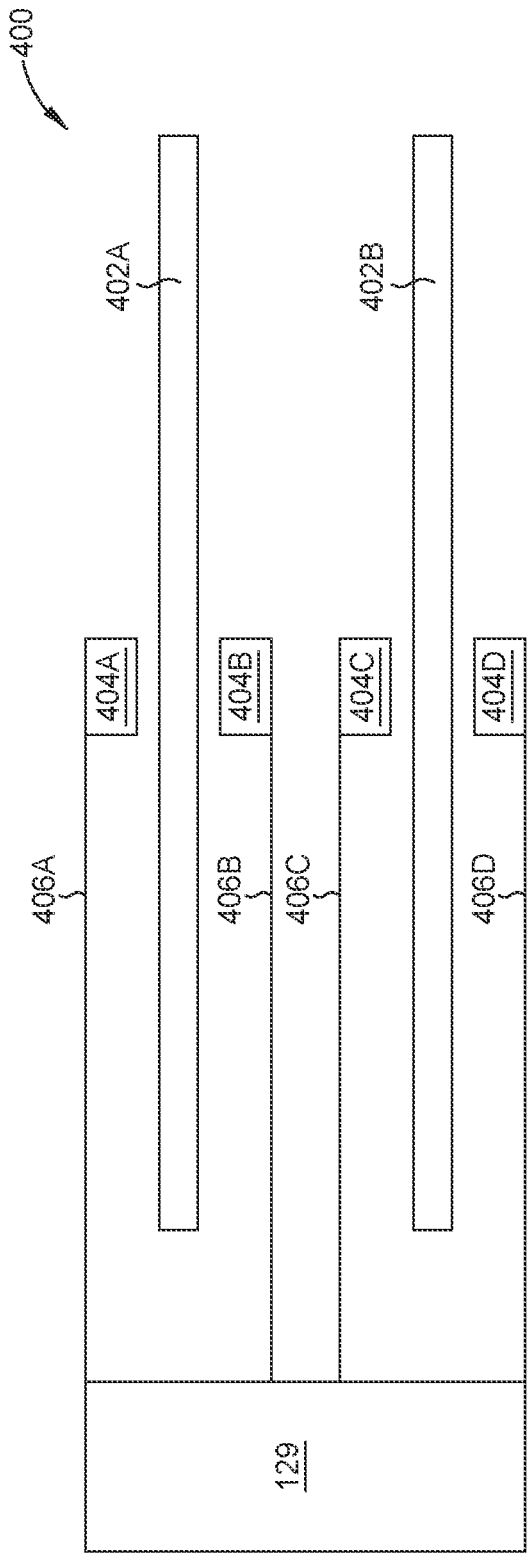
FIG. 4A is a schematic illustration of a HDD assembly having multiple heads and disks according to one embodiment.

FIG. 4A is a schematic illustration of a HDD assembly 400 having multiple heads 404A-404D and disks 402A-402B according to one embodiment. As shown in FIG. 4A, each disk 402A, 402B can have data written to and read from each side of the disk 402A, 402B by a corresponding head 404A-404D. Each head 404A-404D communicates with the control unit 129 (oftentimes referred to as a controller) via communication lines 406A-406D. As will be discussed below, the energy assist element for each head 404A-404D can be supplied with a different current. Furthermore, each head 404A-404D can otherwise be supplied with identical current.

Figure 4B:
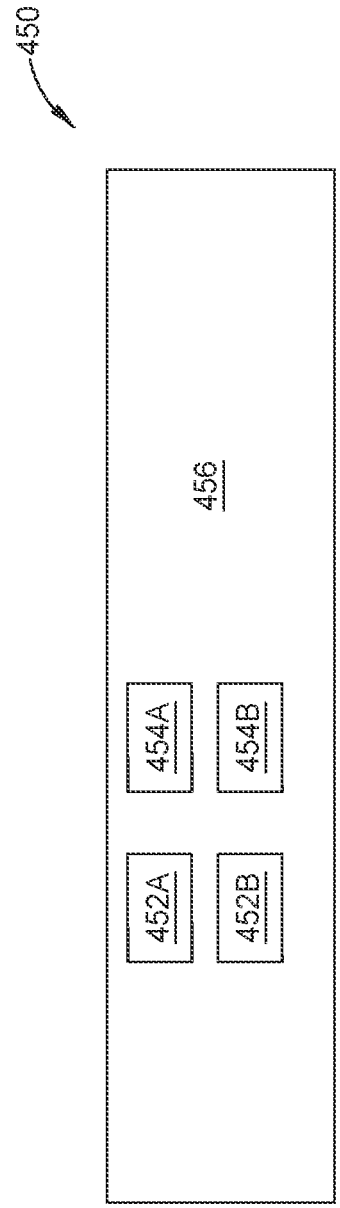
FIG. 4B is a schematic illustration of a tape drive having multiple write heads according to one embodiment.

FIG. 4B is a schematic illustration of a tape drive 450 having multiple write heads 452A, 452B according to one embodiment. Each write head 452A, 452B is disposed opposite a corresponding read head 454A, 454B adjacent a tape 456 to be read. As will be discussed below, the energy assist element for each head 452A, 452B can be supplied with a different current. Furthermore, each head 452A, 452B can otherwise be supplied with identical current.

Mass producing write heads can be challenging. In mass production, write head lifetime specification is defined as lifetime hours at an allowable failure rate, which is extremely small (i.e., <0.1%) to guarantee that only a small percentage of heads will fail the specification. For a design to meet the lifetime specification, the mean time to failure (MTTF) will be thousands of times higher than the lifetime specification.

To increase and meet the lifetime specification, reducing temperature variations within the write head population is proposed. As an example, if the temperature variations for less than 0.1% of all write heads mass produced, the lifetime capability of the overall population of mass produced write heads is increased sufficiently to meet both product reliability and performance requirements. As will be discussed below, rather than utilize a constant current across all write heads, achieving a constant temperature will achieve the goals.

The biggest contributor to the temperature variation of energy assist elements from head to head is from production tolerances of device resistances. This concept is illustrated below based on the non-limiting example case of an STO, where the device resistance is termed the STO resistance (STO-R). The principles of the STO-R example can be applied generally to the device resistances of other types of write assist elements, but for simplicity of description STO-R will be used below. The operating writing temperature, proportional to power ($I^2*R$) is a direct function of STO-R. However, write head lifetime is actually a stronger function of STO-R than simply would be predicted from a power calculation. STO-R variations are also caused by process variations that correlate to write head weakness. For example, higher than nominal STO-R could indicate an internal 'hot spot' is present, causing additional write head lifetime degradation beyond just caused by simple power or temperature variation. By normalizing the temperature of the higher STO-R heads, the additional degradation caused by individual component weaknesses due to production variations will be reduced or even eliminated.

Initially, the impact upon temperature by power or current is determined. Knowing each write head's STO-R, for example, allows calculations of the appropriate current bias to reach a targeted temperature. Such current bias can be applied uniquely to each write head during operation. Thus, in various embodiments of the invention, individual write head can have customized current bias values that are potentially different from other write heads. Within a write head's preamp DAC gain and offset errors, and calculation rounding and resolution errors, substantially the same temperature can be achieved for an entire population of write heads that are mass produced.

To implement the procedure of unique current biases, the STO-R values (or device resistance values, for other types of non-STO based write elements) for each write head are measured during write head manufacturing. When the data storage device (e.g., HDD or tape drive) is assembled, the current bias for each write head is calculated, inputted into the controller of the data storage device, and tested to confirm operation.

Figure 5A:
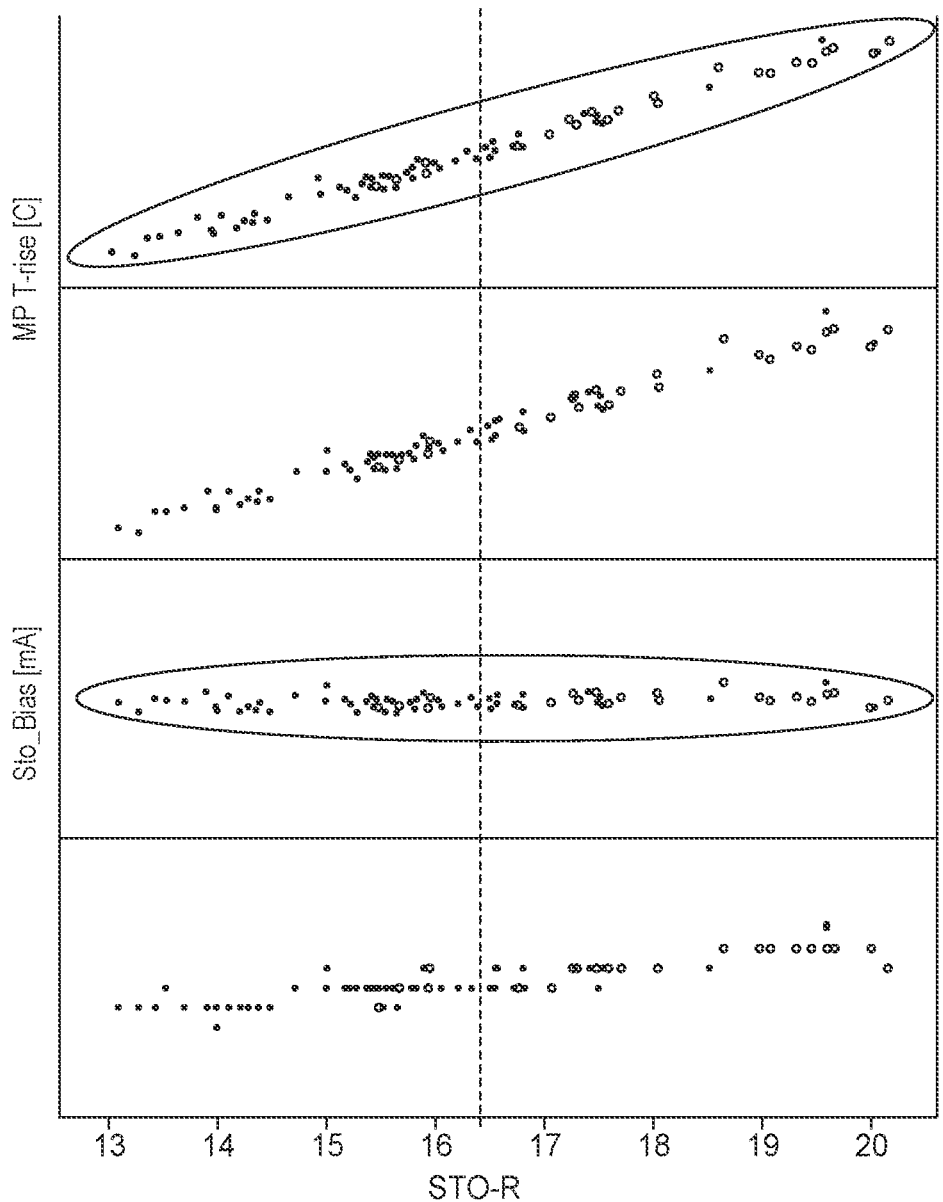
FIG. 5A is a graph illustrating spin torque oscillator (STO) resistance (STO-R) relative to STO bias and main pole temperature in a constant current situation.
Figure 5B:
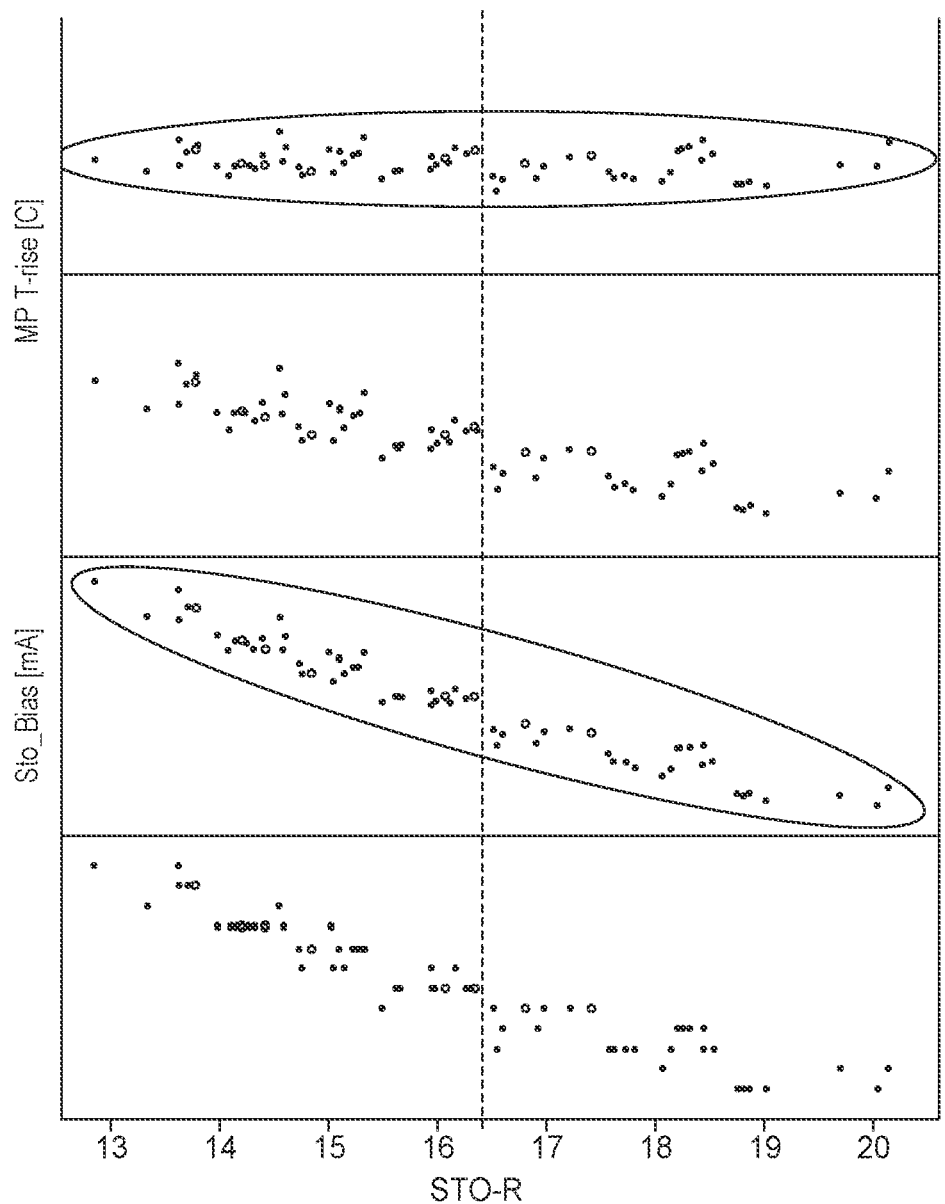
FIG. 5B is a graph illustrating spin torque oscillator (STO) resistance (STO-R) relative to STO bias and main pole temperature in a constant temperature situation.

FIG. 5A is a graph illustrating spin torque oscillator (STO) resistance (STO-R) relative to STO bias and main pole temperature in a constant current situation. FIG. 5B is a graph illustrating spin torque oscillator (STO) resistance (STO-R) relative to STO bias and main pole temperature in a constant temperature situation. Taken together, FIGS. 5A and 5B show a comparison of constant current mode (FIG. 5A) and constant temperature mode (FIG. 5B). FIG. 5A shows that the write head temperature is a direct function of STO-R. FIG. 5B, on the other hand, shows that by utilizing a current bias tailored to each write head, a constant temperature is achieved. From FIG. 5B it is clear that the constant temperature mode's temperature is no longer a function of STO-R.

Figure 6:
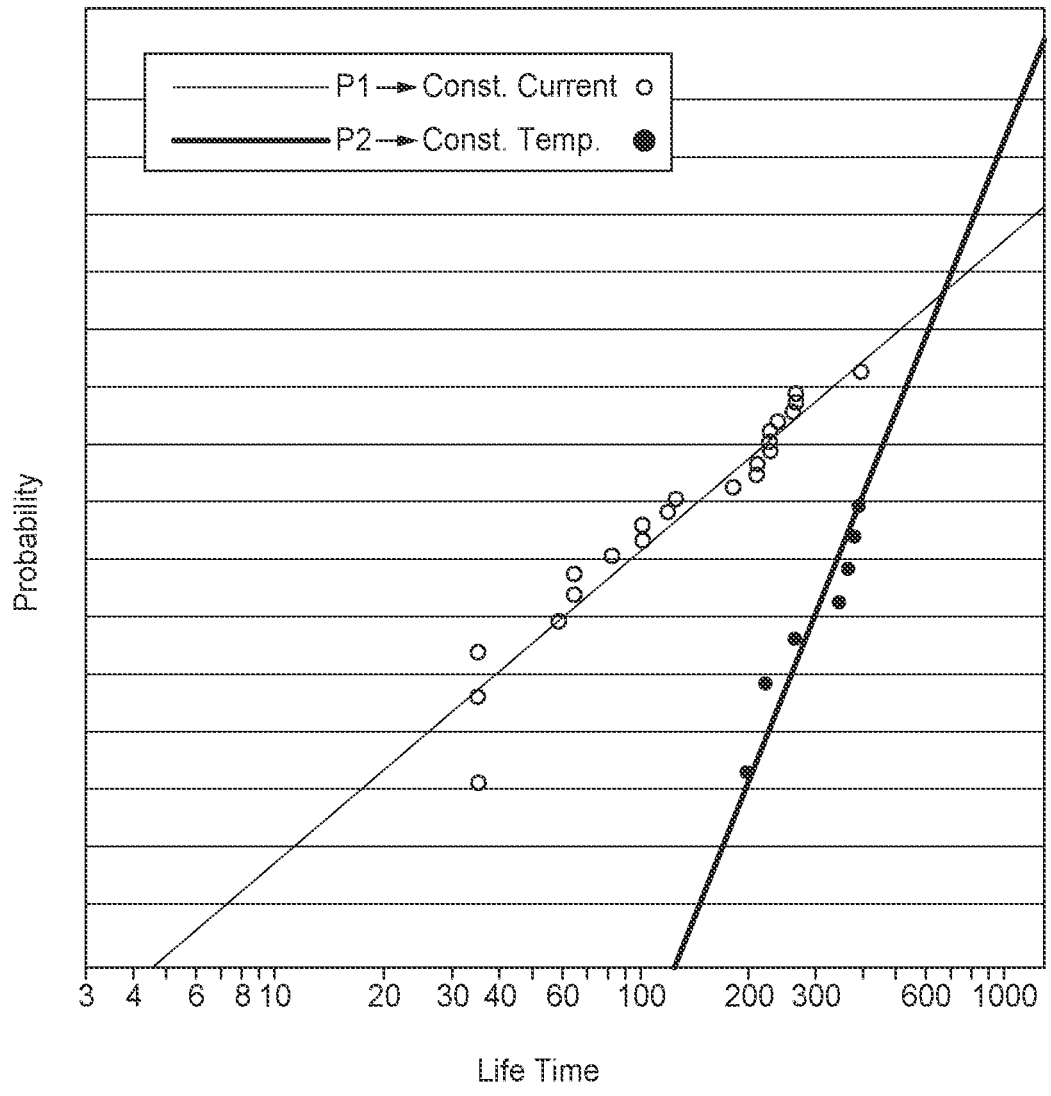
FIG. 6 is a graph illustrating device lifetime relative to probability.

FIG. 6 is a graph illustrating device lifetime relative to probability for the constant temperature mode. The tail of the distribution (i.e., the bottom left part of the lines) is shortened significantly when using the constant temperature mode as opposed to the constant current mode. As such, the constant temperature mode has a much steeper slope (i.e., a lower Log-Std) compared to the constant current mode. Extrapolating to an arbitrary failure rate allowance, it is seen that the lifetime gain can be multiple times for the constant temperature mode as compared to the constant current mode. In other words, lifetime capability of the write heads is improved by multiple times after equalizing the temperature of the write heads in the population of write heads.

Figure 7:
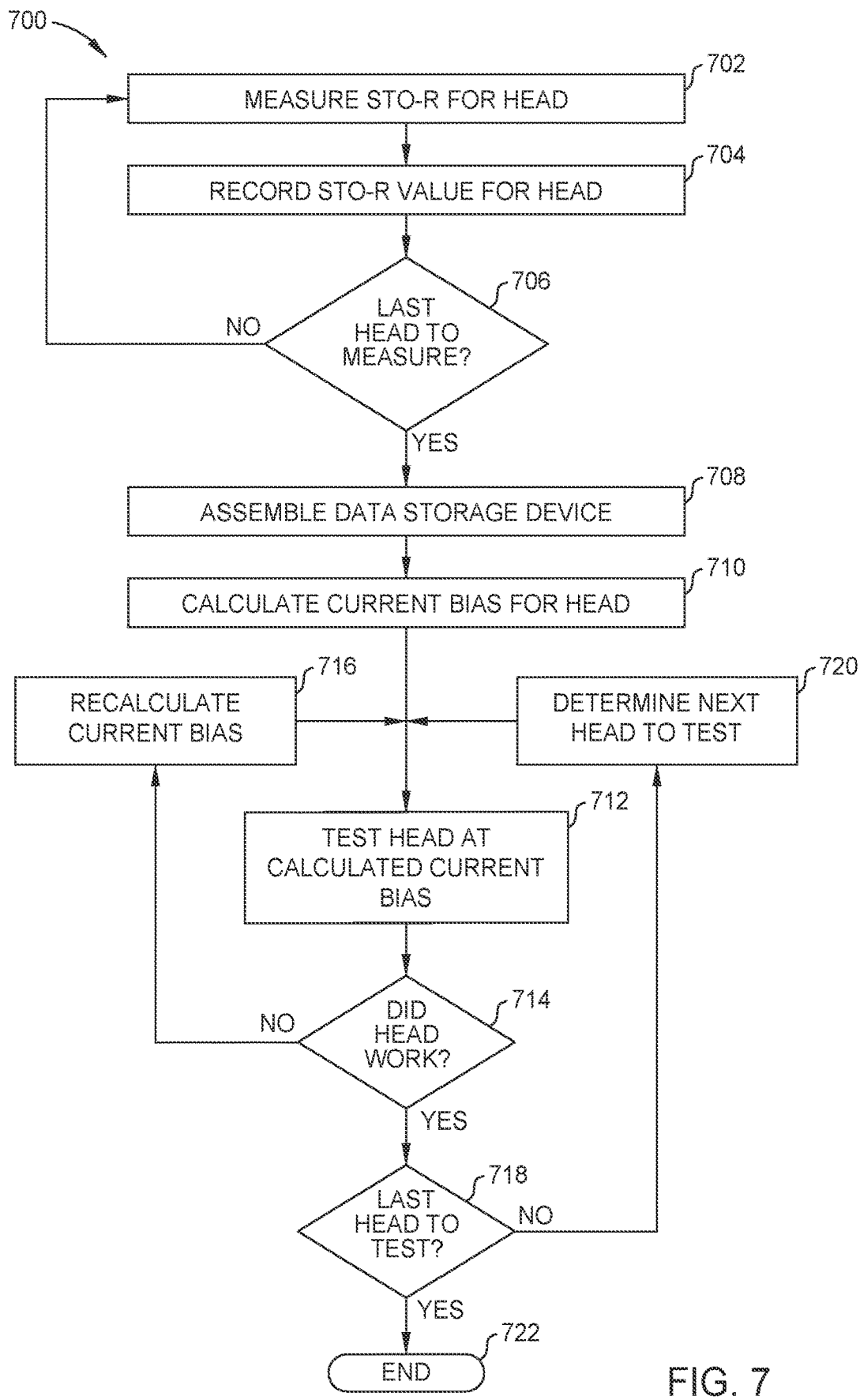
FIG. 7 is a flowchart illustrating a method of obtaining a constant temperature situation across multiple heads.

FIG. 7 is a flowchart 700 illustrating a method of obtaining a constant temperature situation across multiple heads. Initially, the STO-R (or more generally, device resistance value for other types of write assist elements) is measured for a population of heads at 702 and recorded at 704. A data storage device including some of the measured heads may be assembled at 708. At that point, the current bias for each head installed in the data storage device is calculated by calculating the current bias for a head at 710. The head is then tested at 712. If the calculated current does not work (i.e., the temperature achieved at the calculated current is not at or sufficiently near the predetermined temperature) as determined at 714, then the current bias is recalculated at 716 followed by a retesting at 712. Stated another way, the bias current for the specific head is determined by an iterative process of increasing the current until the predetermined temperature is achieved. If, however, the calculated current does work at 714, then a determination is made regarding whether there are additional heads to test at 718. If there is another head to test at 718, then the next head to test is determined at 720 followed by testing at 712. Once the last head is tested at 718, the process ends at 722. The calculated bias current for the installed heads are recorded from this process and used in the operations of the data storage device. It is noted that in various embodiments, the bias current applied to each head is a target value level at which the controller is configured to cause the bias current to meet. It is contemplated that in field recalibration may occur if necessary to account for device resistance changes over time. Furthermore, it is contemplated that the resistance may be characterized upon assembly within the drive either at the time of recalibration after installation of the heads in the device.

By utilizing a unique applied current for each energy assist element, a constant energy assist element temperature is achieved across all energy assist elements in data storage device. In so doing, the energy assist element has an increased device lifetime, leading to longer lifetime of the write head including the energy assist element, and the data storage device utilizing the write head.

In one embodiment, a data storage device comprises: a first write head having a first energy assist element; a second write head having a second energy assist element; and a controller coupled to the first write head and the second write head, wherein the controller is configured to apply a first current to the first energy assist element and a second current to the second energy assist element, wherein the first current is different from the second current. The controller is configured to deliver the first current and the second current while writing data to one or more magnetic recording media. The one or more magnetic recording media comprises a first magnetic recording media and a second magnetic recording media, wherein the first write head is associated with the first magnetic recording media, and wherein the second write head is associated with the second magnetic recording media. Upon application of the first current and the second current, the first energy assist element and the second energy assist element achieve substantially a same temperature at a main pole of each of the first write head and the second write head. The data storage device is a hard disk drive. The data storage device of a tape drive. The first energy assist element is a spin torque oscillator. The first energy assist element comprises a multi-layer stack of magnetic and non-magnetic layers. The first energy assist element comprises a conductive layer. The first energy assist element and the second energy assist element have different resistances. The controller is further configured to apply a third current to the first write head and a fourth current to the second write head. The third current and the fourth current are identical.

In another embodiment, a data storage device comprises: a first means for assisting a writing of data to a storage media; a second means for assisting a writing of data to the storage media; and a controller coupled to the first means and the second means, wherein the controller is configured to cause a different current to be delivered to the first means and the second means while each of the first means and the second means is assisting writing of data to the storage media. The first means is coupled to a first write head and wherein the second means is coupled to a second write head. The different currents are delivered in order to achieve a first temperature of a first main pole of the first write head and a second temperature of a second main pole of the second write head, and wherein the first temperature is substantially equal to the second temperature.

In another embodiment, a method of manufacturing a data storage device comprises: obtaining a first resistance of a first energy assist element of a first write head; calculating a first current to be applied to the first energy assist element to achieve a first temperature of a first main pole of the first write head; obtaining a second resistance of a second energy assist element of a second write head; calculating a second current to be applied to the second energy assist element to achieve a second temperature of a second main pole of the second write head, wherein the first temperature is substantially equal to the second temperature; configuring a controller to apply the first current to the first energy assist element when writing data to a storage media; and configuring the controller to apply the second current to the second energy assist element when writing data to the storage media. The first current and the second current are different. The first resistance and the second resistance are different. The first energy assist element and the second energy assist element are structurally identical. The first current comprises a calculating a current applied to the first energy assist element that achieves the first temperature at the first main pole when applying the first current to the first energy assist element and a third current to the first write head. Calculating the second current comprises a calculating a current applied to the second energy assist element that achieves the second temperature at the second main pole when applying the second current to the second energy assist element and the third current to the second write head.

In another embodiment, a method of writing data in a data storage device comprising a first write head comprising a first energy assist element and a second write head comprising a second energy assist element, the method comprising: applying a first target bias current to the first energy assist element when using the first write head to write data to a storage media, to achieve a first temperature of a main pole of the first write head; and applying a second target bias current to the second energy assist element when using the second write head to write data to the storage media, to achieve a second temperature of a main pole of the second write head, wherein first temperature is substantially equal to the second temperature, and wherein the first current and the second current are different.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a first write head comprising a first energy assist element;
a second write head comprising a second energy assist element, wherein the first energy assist element and the second energy assist element have different resistances; and
a controller configured to apply a first current to the first energy assist element and a second current to the second energy assist element, wherein the first current is different from the second current.

2. The data storage device of claim 1, wherein the controller is further configured to deliver the first current and the second current while writing data to one or more magnetic recording media.

3. The data storage device of claim 2, wherein the one or more magnetic recording media comprises a first magnetic recording media and a second magnetic recording media, wherein the first write head is associated with the first magnetic recording media, and wherein the second write head is associated with the second magnetic recording media.

4. The data storage device of claim 1, wherein upon application of the first current and the second current, the first energy assist element and the second energy assist element achieve substantially a same temperature at a main pole of each of the first write head and the second write head.

5. The data storage device of claim 1, wherein the data storage device is a hard disk drive.

6. The data storage device of claim 1, wherein the data storage device is a tape drive.

7. The data storage device of claim 1, wherein the first energy assist element is a spin torque oscillator.

8. The data storage device of claim 1, wherein the first energy assist element comprises a multi-layer stack of magnetic and non-magnetic layers.

9. The data storage device of claim 1, wherein the first energy assist element comprises a conductive layer.

10. The data storage device of claim 1, wherein the controller is further configured to apply a third current to a main pole of the first write head and a fourth current to a main pole of the second write head, wherein the third current and the fourth current are identical.

11. A data storage device, comprising:
a first means for assisting a writing of data to a storage media, the first means having a first resistance;
a second means for assisting a writing of data to the storage media, the second means having a second resistance different than the first resistance; and
a controller configured to cause a different current to be delivered to the first means and the second means while each of the first means and the second means is assisting writing of data to the storage media.

12. The data storage device of claim 11, wherein the first means is coupled to a first write head and wherein the second means is coupled to a second write head.

13. The data storage device of claim 12, wherein the different currents are delivered in order to achieve a first temperature of a first main pole of the first write head and a second temperature of a second main pole of the second write head, and wherein the first temperature is substantially equal to the second temperature.

14. A data storage device, comprising:
a first write head comprising a first energy assist element;
a second write head comprising a second energy assist element; and
a controller configured to:
apply a first current to the first energy assist element and a second current to the second energy assist element, wherein the first current is different from the second current; and
apply a third current to a main pole of the first write head and a fourth current to a main pole of the second write head, wherein the third current and the fourth current are identical.

15. The data storage device of claim 14, wherein the controller is further configured to deliver the first current and the second current while writing data to one or more magnetic recording media.

16. The data storage device of claim 15, wherein the one or more magnetic recording media comprises a first magnetic recording media and a second magnetic recording media, wherein the first write head is associated with the first magnetic recording media, and wherein the second write head is associated with the second magnetic recording media.

17. The data storage device of claim 14, wherein upon application of the first current and the second current, the first energy assist element and the second energy assist element achieve substantially a same temperature at a main pole of each of the first write head and the second write head.

18. The data storage device of claim 14, wherein the data storage device is a hard disk drive.

19. The data storage device of claim 14, wherein the data storage device is a tape drive.

20. The data storage device of claim 14, wherein the first energy assist element is a spin torque oscillator.

21. The data storage device of claim 14, wherein the first energy assist element and the second energy assist element have different resistances.

* * * * *